United States Patent
Ishikita et al.

(10) Patent No.: US 12,478,345 B2
(45) Date of Patent: Nov. 25, 2025

(54) AUSCULTATION-ASSISTING TOOL AND STETHOSCOPE

(71) Applicant: Naoyuki Ishikita, Niigata (JP)

(72) Inventors: Naoyuki Ishikita, Niigata (JP); Toshiyuki Morishima, Tokyo (JP)

(73) Assignee: Naoyuki Ishikita, Niigata (JP)

( * ) Notice: Subject to any disclaimer, the term of this patent is extended or adjusted under 35 U.S.C. 154(b) by 1091 days.

(21) Appl. No.: 17/600,856

(22) PCT Filed: Apr. 3, 2020

(86) PCT No.: PCT/JP2020/015397
§ 371 (c)(1),
(2) Date: Oct. 1, 2021

(87) PCT Pub. No.: WO2020/204182
PCT Pub. Date: Oct. 8, 2020

(65) Prior Publication Data
US 2022/0151583 A1    May 19, 2022

(30) Foreign Application Priority Data
Apr. 3, 2019   (JP) ................................ 2019-071674

(51) Int. Cl.
*A61B 7/02*    (2006.01)
*G10K 11/168*  (2006.01)
*G10K 11/22*   (2006.01)

(52) U.S. Cl.
CPC .............. *A61B 7/02* (2013.01); *G10K 11/168* (2013.01); *G10K 11/22* (2013.01)

(58) Field of Classification Search
CPC ......... A61B 7/02; G10K 11/168; G10K 11/22
See application file for complete search history.

(56) References Cited

U.S. PATENT DOCUMENTS 3,032,030 A * 5/1962 Han ........................ A61B 7/02
                                              600/491
3,621,845 A * 11/1971 Oates ................. A61B 5/02233
                                              D24/134
(Continued)

FOREIGN PATENT DOCUMENTS

CN       101091658 A      12/2007
CN       203280406 U      11/2013
(Continued)

OTHER PUBLICATIONS

Google machine translation of CN 203280406 U (Year: 2013).*
(Continued)

*Primary Examiner* — Justin Xu
(74) *Attorney, Agent, or Firm* — Future IP LLC; Tomoko Nakajima

(57) ABSTRACT

An auscultation-assisting tool includes a hollow sheet detachably attached to a diaphragm included in a chest piece. The hollow sheet includes a first film portion detachably attached to the diaphragm included in the chest piece, a second film portion to be brought into contact with an examination site and being deformable in conformity with an irregular surface of the examination site, and a hollow portion provided hermetically between the first film portion and the second film portion. A transmission medium that transmits sound is sealed in the hollow portion.

13 Claims, 5 Drawing Sheets

(56) References Cited

U.S. PATENT DOCUMENTS

| | | | |
|---|---|---|---|
| 4,995,473 A | 2/1991 | Packard | |
| 5,616,845 A * | 4/1997 | Hickling | A01M 1/026 |
| | | | 73/587 |
| 5,686,706 A * | 11/1997 | Wurzburger | A61B 7/026 |
| | | | 181/131 |
| 5,920,038 A | 7/1999 | Foster | |
| 6,019,187 A | 2/2000 | Appavu | |
| 7,424,929 B1 | 9/2008 | Martinez | |
| 2005/0165310 A1 * | 7/2005 | Bindefeld | A61B 8/06 |
| | | | 600/453 |
| 2007/0045039 A1 | 3/2007 | Agahi et al. | |
| 2008/0093157 A1 | 4/2008 | Drummond et al. | |
| 2012/0232427 A1 * | 9/2012 | Bakema | B06B 1/06 |
| | | | 600/586 |
| 2014/0276055 A1 * | 9/2014 | Barthe | A61B 8/4466 |
| | | | 600/439 |
| 2018/0344282 A1 | 12/2018 | Lin et al. | |
| 2019/0105012 A1 * | 4/2019 | Falkner | A61B 7/02 |

FOREIGN PATENT DOCUMENTS

| | | |
|---|---|---|
| CN | 205795719 U | 12/2016 |
| DE | 2607990 A1 | 12/1976 |
| DE | 202013104390 U1 | 11/2013 |
| JP | 2000000237 A | 1/2000 |
| JP | 2008-526310 A | 7/2006 |
| JP | 2007-061284 A | 3/2007 |
| JP | 2007-506494 A | 3/2007 |
| JP | 2015-204870 A | 11/2015 |
| JP | 2020-168217 A | 10/2020 |
| TW | M247176 U | 10/2004 |
| WO | WO2017/015286 A1 | 7/2016 |

OTHER PUBLICATIONS

Google machine translation of JP 2007061284 (Year: 2005).*
Extended European Search Report for European Patent App. No. 20784893.8 (Oct. 6, 2022).
Chinese Office Action for Application No. 202080023646.5 (dated Jun. 13, 2024) with English language translation thereof.
International Search Report for PCT Patent App. No. PCT/JP2020/015397 (Jun. 23, 2020).
Indian First Office Action (Dec. 20, 2023) for the corresponding Indian patent application No. 202117044576.
Chinese Notification to Grant Patent Right for Invention for Application No. 202080023646.5 (dated Nov. 21, 2024) with English language translation thereof.

* cited by examiner

AUSCULTATION-ASSISTING TOOL AND STETHOSCOPE

This application is a national phase entry under 35 U.S.C. §371 of PCT Patent Application No. PCT/JP2020/015397, filed on Apr. 3, 2020, which claims priority under 35 U.S.C. §119 to Japanese Patent Application No. 2019-071674, filed Apr. 3, 2019, both of which are incorporated by reference.

TECHNICAL FIELD

The present invention relates to an auscultation-assisting tool to be attached for use to a stethoscope, and also relates to a stethoscope.

BACKGROUND ART

A stethoscope to be used in medical practice or the like includes a chest piece that receives sounds from an examination site, ear tips to be fitted to the ears of an examiner, and a tube that connects the chest piece to the ear tips and through which the sounds from the examination site are transmitted to the examiner.

There has been a demand that such a stethoscope provide improved audibility of auscultatory sounds. For example, a technique has been proposed by PTL 1, in which the audibility of auscultatory sounds is improved by reducing a frictional sound generated between the chest piece and the examination site.

CITATION LIST

Patent Literature

PTL 1: Japanese Unexamined Patent Application Publication (Translation of PCT Application) No. 2008-526310

SUMMARY OF INVENTION

Technical Problem

However, the fitting between the chest piece of the above known stethoscope and the examination site may occasionally be insufficient because of factors such as an irregular surface of the examination site. In such a situation, for example, not the entirety of a diaphragm included in the chest piece may be allowed to vibrate, or noises may be received through gaps between the chest piece and the examination site. Consequently, the audibility of auscultatory sounds may be deteriorated.

The present invention has been conceived in view of the above circumstances and aims to provide an auscultation-assisting tool and a stethoscope with which the audibility of auscultatory sounds is improved.

Solution to Problem

An auscultation-assisting tool according to an embodiment of the present invention is to be attached for use to a stethoscope, the stethoscope including a chest piece having a contact portion to be brought into contact with an examination site, the chest piece receiving sounds from the examination site. The auscultation-assisting tool includes a hollow sheet detachably attached to a diaphragm included in the chest piece. The hollow sheet includes a first film portion detachably attached to the diaphragm, a second film portion to be brought into contact with the examination site and being deformable in conformity with an irregular surface of the examination site, and a hollow portion provided hermetically between the first film portion and the second film portion. A transmission medium that transmits sound is sealed in the hollow portion.

A stethoscope according to another embodiment of the present invention includes a chest piece having a contact portion to be brought into contact with an examination site, the chest piece receiving sounds from the examination site; ear tips to be fitted to ears of an examiner; and a tube that connects the chest piece to the ear tips and through which the sounds from the examination site are transmitted to the examiner. The chest piece includes a diaphragm to which the above auscultation-assisting tool is attached.

Advantageous Effects of Invention

According to the present invention, an auscultation-assisting tool and a stethoscope with which the audibility of auscultatory sounds is improved are provided.

BRIEF DESCRIPTION OF DRAWINGS

FIG. 4 is a side view of relevant parts of the stethoscope equipped with the auscultation-assisting tool according to the embodiment of the present invention, with a damping sheet interposed in between.

DESCRIPTION OF EMBODIMENTS

Preferred embodiments of the present invention will now be described in detail with reference to the drawings. The embodiments to be described below do not unreasonably limit the contents of the present invention defined by the appended claims. Not all the elements described in the following embodiments are essential as the solution proposed by the present invention.

Stethoscope

Figure 1:
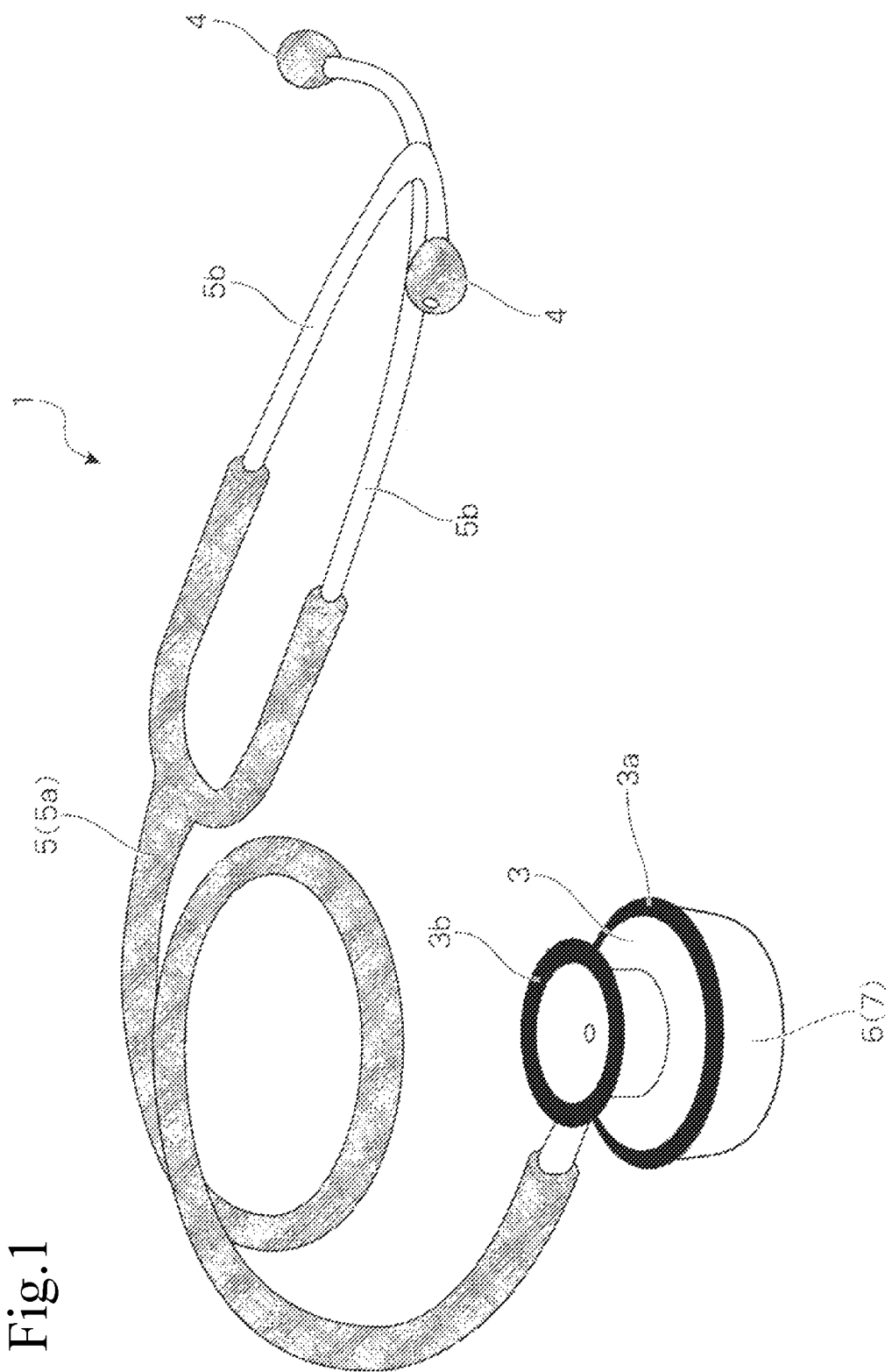
FIG. 1 is a perspective view of a stethoscope according to an embodiment of the present invention.

As illustrated in FIG. 1, a stethoscope 1 includes a chest piece 3 having contact portions 3a and 3b to be brought into contact with an examination site 2 (see FIG. 3) of a human body or the like, the chest piece 3 receiving sounds from the examination site 2; a pair of ear tips 4 to be fitted to the ears of an examiner; a tube 5 that connects the chest piece 3 to the ear tips 4 and through which the sounds from the examination site 2 are transmitted to the examiner; and an auscultation-assisting tool 6 attached to the chest piece 3.

The chest piece 3, according to an embodiment, has the two contact portions 3a and 3b on the front and back sides thereof, respectively. The contact portion 3a on one side is provided with a diaphragm 30 and is used in receiving high-frequency components of the sounds coming from the examination site 2. The contact portion 3b on the other side is provided with an open bell and is used in receiving low-frequency components of the sounds coming from the examination site 2.

The tube 5 according to the present embodiment includes a rubber tube 5a, one end of which is connected to the chest piece 3 and the other end of which branches out into two. The tube 5 further includes a pair of metal tubes 5b, which connect the two branches of the rubber tube 5a to the ear tips 4, respectively.

Auscultation-Assisting Tool

Figure 2A:
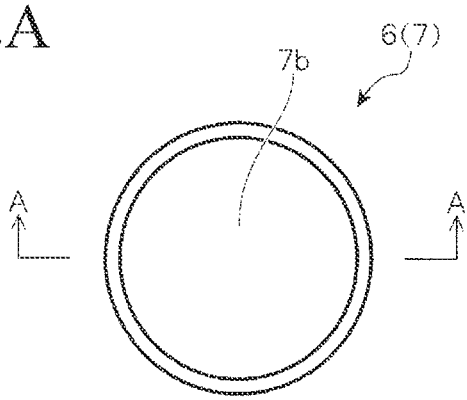
FIG. 2 illustrates an auscultation-assisting tool according to the embodiment of the present invention and includes (a) a plan view of the auscultation-assisting tool, (b) a side view of the auscultation-assisting tool, and (c) an enlarged sectional view of the auscultation-assisting tool taken along line A-A.
Figure 2B:
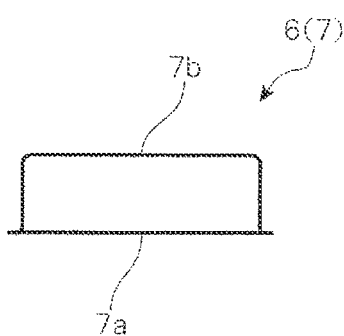
Figure 2C:
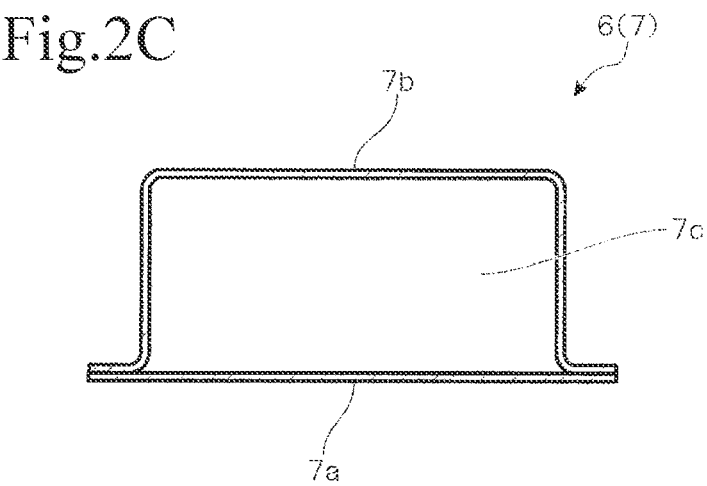

As illustrated in FIG. 2, the auscultation-assisting tool 6 includes a hollow sheet 7. The hollow sheet 7 is detachably attached to the diaphragm 30 provided at the contact portion 3a of the chest piece 3. The hollow sheet 7 includes a first film portion 7a detachably attached to the diaphragm 30 provided at the contact portion 3a of the chest piece 3, a second film portion 7b to be brought into contact with the examination site 2 and being deformable in conformity with an irregular surface of the examination site 2, and a hollow portion 7c provided hermetically between the first film portion 7a and the second film portion 7b. A transmission medium that transmits sound is sealed in the hollow portion 7c.

The second film portion 7b of the auscultation-assisting tool 6 closely fits the irregular surface of the examination site 2. Furthermore, the sounds received from the examination site 2 are transmitted through the transmission medium in the hollow portion 7c to the diaphragm 30 provided at the contact portion 3a of the chest piece 3. Such a configuration allows the entirety of the diaphragm 30 provided at the contact portion 3a of the chest piece 3 to vibrate and also prevents the entry of noises through gaps between the chest piece 3 and the examination site 2. Consequently, the audibility of auscultatory sounds is improved. If the examination site 2 is a part of a human body, the auscultation-assisting tool 6 is interposed between the chest piece 3 and the human body and thus prevents the transmission of a tactile sensation of unpleasant coolness or hardness of the chest piece 3, which is made of metal, to the human body. Furthermore, if the auscultation-assisting tool 6 is replaced with a new one for every patient, the infection with diseases through the stethoscope 1 is also prevented.

Furthermore, the fitting of the stethoscope to some examinees, such as a small newborn baby and a thin person with little subcutaneous fat, is increased. In the known art, particularly in cases of examinees such as an extremely premature infant who is too small to have a flat examinable surface, chest pieces of smaller sizes need to be prepared. If the present invention is applied to such cases, chest pieces of a single size will do.

As illustrated in FIG. 2(a), it is preferable that the hollow portion 7c have the same circular plan-view shape as the diaphragm 30 provided at the contact portion 3a of the chest piece 3 and have substantially the same diameter as the diaphragm 30 to which the auscultation-assisting tool 6 is to be attached. Such a configuration allows the sounds received from the examination site 2 to be efficiently transmitted to the chest piece 3.

The plan-view shape, not specifically illustrated, of the hollow portion 7c is not limited to a circle and may be an oval, a polygon, or the like. The number of hollow portions 7c to be provided to a single auscultation-assisting tool 6 is not limited to one. A single auscultation-assisting tool 6 may have a plurality of hollow portions 7c. Known stethoscopes include those having oval chest pieces 3 and those having chest pieces 3 each divided into two pieces to generate a stereo sound. The configuration of the auscultation-assisting tool 6 may be changed appropriately in accordance with the shape and size of the diaphragm 30 provided to the chest piece 3.

The transmission medium to be sealed in the hollow portion 7c is preferably gas but may be liquid or gel exhibiting such a level of fluidity as not to hinder the second film portion 7b from deforming in conformity with the irregular surface of the examination site 2.

It is preferable that the gas as the transmission medium be air or carbon dioxide. If the gas to be sealed in the hollow portion 7c is air, it is advantageous that the auscultation-assisting tool 6 is manufacturable with ease. If the gas to be sealed in the hollow portion 7c is carbon dioxide, a sound-amplifying effect is obtained. Therefore, the audibility of auscultatory sounds is further improved.

It is preferable that the liquid as the transmission medium be water or pure water, which does no harm to human bodies. With such a liquid, even if the first film portion 7a or the second film portion 7b is broken and the liquid in the hollow portion 7c leaks, there is no harm to human bodies.

It is preferable that the material for the first film portion 7a and the second film portion 7b be a resin that exhibits high flexibility and excellent airtightness. Examples of such a resin to make the films include ethylene-vinyl acetate copolymer, polyethylene terephthalate, polyurethane, polyethylene, parellin, polyester, polypropylene, and the like.

It is preferable that the first film portion 7a and the second film portion 7b each have a thickness of 10 μm to 0.5 mm. If the first film portion 7a and the second film portion 7b each have a thickness below the above range, the film portions 7a and 7b may be broken and leak the medium from the hollow portion 7c. If the first film portion 7a and the second film portion 7b each have a thickness over the above range, the film portions 7a and 7b may be difficult to deform in conformity with the irregular surface of the examination site 2. Moreover, the performance of sound transmission may be deteriorated. On the other hand, the first film portion 7a and the second film portion 7b may each be transparent or colored, or may have a usage note, an advertisement, a pattern, and so forth printed thereon. If the examinee is a small child, the second film portion 7b may have children-oriented cartoon characters or the like printed thereon.

The auscultation-assisting tool 6 configured as above is manufactured as follows. For example, molten resin is continuously discharged from a flat die in such a manner as to form a film and is brought into contact with the outer peripheral surface of a forming roll (not illustrated) having a predetermined number of suction cavities. Then, vacuum forming is performed to form hollow projections. Thus, a cap film (a set of second film portions 7b) is obtained. Furthermore, a back film (a set of first film portions 7a) is provided over the open sides of the vacuum-formed projections and is heat-sealed to the cap film in such a manner as to seal air in the projections, whereby a set of hollow sheets 7 is obtained. Subsequently, the set of hollow sheets 7 is cut into pieces each serving as an auscultation-assisting tool 6. Such a method makes it easy to manufacture auscultation-assisting tools 6 each including hollow portions 7c filled with air serving as the transmission medium. An alternative manufacturing method is as follows. For example, a transmission medium is fed into second film portions 7b, which are formed beforehand into a predetermined shape, and is sealed therein with first film portions 7a. In the process of manufacturing auscultation-assisting tools 6, so-called sterilized cotton, which is obtained by soaking absorbent cotton or the like with a disinfectant, may be sealed in addition to the transmission medium in hollow portions 7c. The sterilized cotton may be removed after the auscultation and be used to sterilize the examined site, the fingers of the user, the stethoscope, and so forth.

It is preferable that the first film portion 7a include an adhesive layer provided with adhesive and be pasted to the diaphragm at the contact portion 3a of the chest piece 3 with the aid of the adhesive layer. Such a configuration not only makes it easy to attach or detach the auscultation-assisting tool 6 to or from the chest piece 3 but also makes it possible to provide the auscultation-assisting tool 6 while being pasted to release paper.

Preferable adhesive is a low-tack adhesive material exhibiting such an adhesion that the auscultation-assisting tool 6 is easily releasable from the chest piece 3 after use while being prevented from dropping during use. For example, it is preferable that the adhesion of the adhesive material be about the same as that of the adhesive material employed by "Post-It (a registered trademark)" from 3M. Alternatively, an adhesive material that exerts adhesion when absorbing water, such as the one intended for a so-called water-activated tape, may be employed. Moreover, the adhesive layer may be a piece of double-sided tape obtained by applying adhesive to both sides of a base film.

In distributing auscultation-assisting tools 6, it is hygienically preferable that one or a plurality of auscultation-assisting tools 6 that are separated from one another be pasted to release paper and be aseptically packed. Alternatively, a plurality of auscultation-assisting tools 6 that are continuous with one another but sectioned by perforations or the like may be distributed in the form of a roll.

It is preferable that the second film portion 7b have a nonslip characteristic with which slipping on the examination site 2 is suppressed. For example, the second film portion 7b may be made from a film material that is less slippery, such as elastomer. Alternatively, the nonslip characteristic may be given to the second film portion 7b by, for example, applying a nonslip agent that suppresses slipping, such as epoxy resin, to a surface of the second film portion 7b that is to be brought into contact with the examination site 2. Thus, slipping on the examination site 2 is suppressed. Therefore, the occurrence of a frictional sound caused by slipping is suppressed. Consequently, the audibility of auscultatory sounds is further improved.

It is preferable that the second film portion 7b be subjected to an antimicrobial process that suppresses the propagation of germs. For example, if an antimicrobial agent that suppresses the propagation of germs (such as "ASK" from Nissho Chemistry Company Limited) is applied to or mixed into the surface of the second film portion 7b that is to be brought into contact with the examination site 2, the infection with diseases that may be caused by the propagation of germs can be suppressed.

It is also preferable that the transmission medium to be sealed in the hollow portion 7c be subjected to a sterilization process before or after being sealed in the hollow portion 7c.

How to Use

Figure 3A:
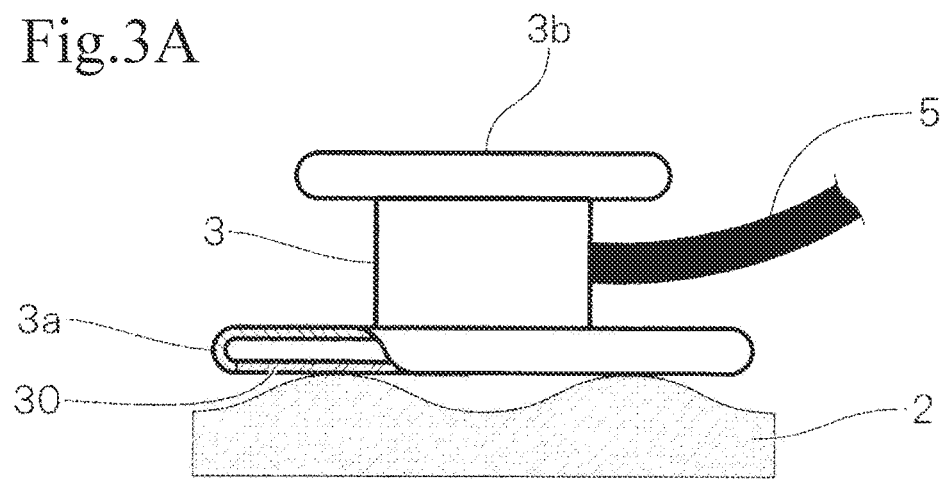
FIG. 3 illustrates an effect produced by the auscultation-assisting tool according to the embodiment of the present invention and includes (a) a side view of relevant parts of a stethoscope not equipped with the auscultation-assisting tool, and (b) a side view of relevant parts of a stethoscope equipped with the auscultation-assisting tool.

As illustrated in FIG. 3(a), when sounds from an examination site 2 having an irregular surface are listened to by auscultation, it is difficult to ensure the fitting between the chest piece 3 and the examination site 2. Therefore, not the entirety of the diaphragm 30 included in the chest piece may be allowed to vibrate, or noises may be received through gaps between the chest piece 3 and the examination site 2. Consequently, the audibility of auscultatory sounds may be deteriorated.

Figure 3B:
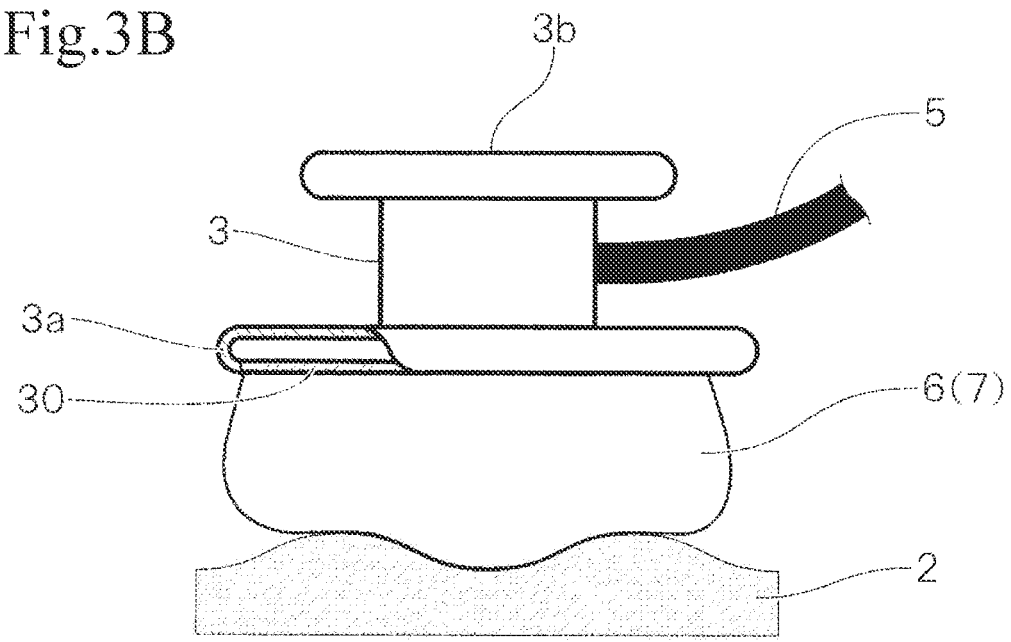

In such a situation, as illustrated in FIG. 3(b), the auscultation-assisting tool 6 is attached to the diaphragm 30 provided at the contact portion 3a of the chest piece 3. Specifically, the auscultation-assisting tool 6 is pasted to the diaphragm 30 provided at the contact portion 3a of the chest piece 3, with the aid of the adhesive layer provided on the first film portion 7a of the auscultation-assisting tool 6. When the chest piece 3 in such a state is brought into contact with the examination site 2, the second film portion 7b closely fits the irregular surface of the examination site 2. Furthermore, the sounds received from the examination site 2 are transmitted through the transmission medium sealed in the hollow portion 7c to the diaphragm 30 provided at the contact portion 3a of the chest piece 3. In FIG. 3, a part of the chest piece 3 is cut off to illustrate the section thereof.

If the auscultation-assisting tool 6 is used as described above, the entirety of the diaphragm provided at the contact portion 3a of the chest piece 3 is allowed to vibrate. Furthermore, the entry of noises through gaps between the chest piece 3 and the examination site 2 is prevented. Therefore, the audibility of auscultatory sounds is improved. If the examination site 2 is a part of a human body, the auscultation-assisting tool 6 is interposed between the chest piece 3 and the human body and thus prevents the transmission of a tactile sensation of unpleasant coolness or hardness of the chest piece 3, which is made of metal, to the human body. Furthermore, if the auscultation-assisting tool 6 is replaced with a new one for every patient, the infection with diseases through the stethoscope 1 is also prevented.

The use of the auscultation-assisting tool 6 according to the present embodiment not only improves the audibility of auscultatory sounds but also unnecessarily improves the audibility of sounds that are irrelevant to auscultation. For example, while heart sounds are listened to by auscultation, if noises such as breath sounds and lung sounds are also received, the heart sounds may be difficult to listen to.

Figure 4:
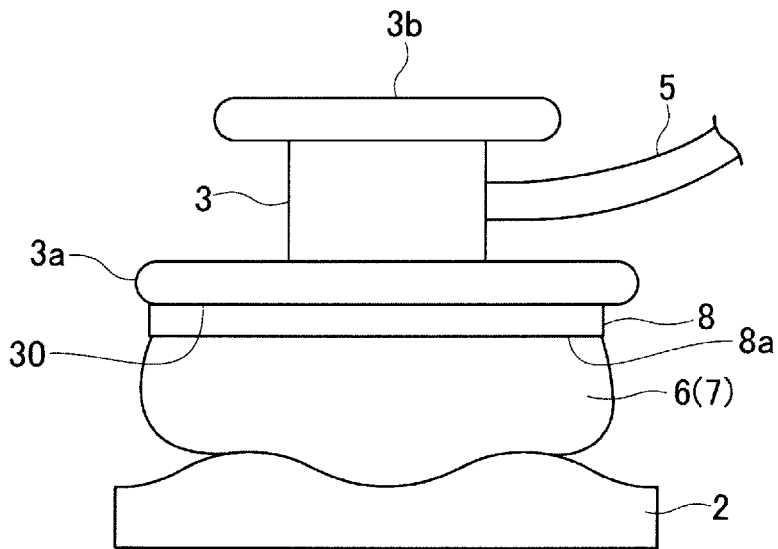

Therefore, as illustrated in FIG. 4, an auscultatory sound filter 8 that filters out and cuts off sounds of low and middle ranges may be provided between the diaphragm 30 provided at the contact portion 3a of the chest piece 3 and the hollow sheet 7 of the auscultation-assisting tool 6. The auscultatory sound filter 8 is a damping sheet, which is a rubber-like elastic member having a thickness of about 0.5 to 2 mm and made of a material such as NBR (nitrile rubber) or ACM (acrylic rubber). The auscultatory sound filter 8 may be formed of a single layer or a plurality of thin layers stacked one on top of another.

The auscultatory sound filter 8 serving as a damping sheet and interposed between the diaphragm 30 and the hollow sheet 7 absorbs sounds and vibrations at a predetermined frequency and below and converts the sounds and vibrations into thermal energy. Thus, the auscultatory sound filter 8 filters out noises at frequencies of 30 Hz and below, such as breath sounds and lung sounds, thereby making it easy to listen to heart sounds, which are at frequencies of about 30 to 100 Hz. In particular, if the examiner wants to concentrate on the auscultation of heart sounds during the examination, the auscultatory sound filter 8 may be interposed between the diaphragm 30 and the hollow sheet 7, so that noises at frequencies of 30 Hz and below are cut off. Accordingly, more accurate auscultation of heart sounds is achieved with higher sensitivity to subtle changes in the heart sounds. Thus, highly accurate auscultation of heart sounds is achieved.

That is, if the auscultatory sound filter 8 is interposed between the diaphragm 30 and the hollow sheet 7, not only the advantageous effects of the auscultation-assisting tool 6 described above are produced, but also noises of low and middle ranges are cut off. Since the hollow sheet 7 is deformable in conformity with the irregular surface of the examination site 2 whose size and shape vary, the entry of noises through gaps between the chest piece 3 and the examination site 2 is suppressed. Thus, the audibility of auscultatory sounds is improved. Furthermore, the auscultatory sound filter 8 filters out noises of low and middle ranges. Consequently, highly accurate auscultation of heart sounds is achieved.

It is preferable that the auscultatory sound filter 8 further include an adhesive layer formed by providing adhesive that is adherable to the hollow sheet 7 over a face 8a thereof. Preferable adhesive forming the adhesive layer is a low-tack adhesive material exhibiting such an adhesion that the auscultation-assisting tool 6 is easily releasable from the chest piece 3 after use while being prevented from dropping during use. For example, it is preferable that the adhesion of the adhesive material be about the same as that of the adhesive material employed by "Post-It (a registered trademark)" from 3M. In such a configuration, the adhesive layer is provided on the auscultatory sound filter 8, which is made of a material that is easier for adhesive to adhere to than to the hollow sheet 7. Therefore, the attaching and detaching of the auscultation-assisting tool 6 is done more assuredly with the aid of the adhesive layer and easily. Furthermore, the dropping of the auscultation-assisting tool 6 is suppressed.

In the auscultation-assisting tool 6 according to the above embodiment, the transmission medium, such as air, is sealed in the hollow portion 7c of the hollow sheet 7. The transmission medium may be sealed in the hollow portion 7c when necessary.

Figure 5A:
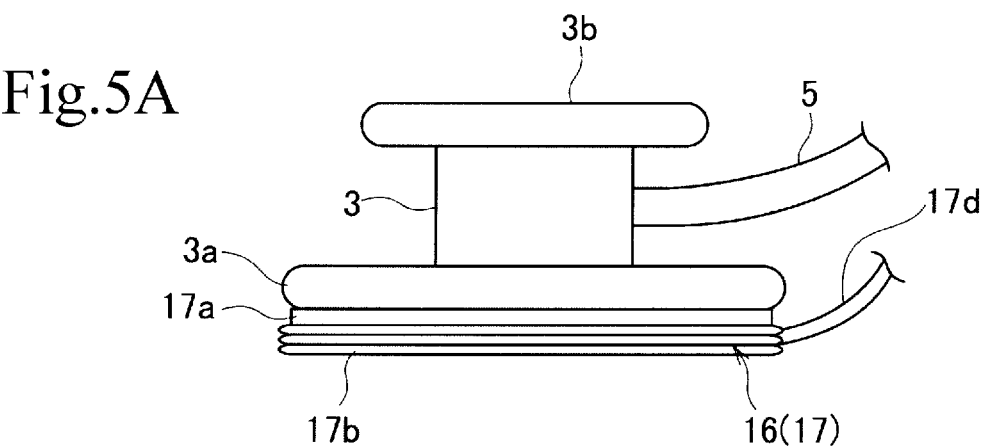
FIG. 5 illustrates an auscultation-assisting tool according to another embodiment of the present invention and includes (a) a side view of the auscultation-assisting tool with a hollow portion thereof contracted, and (b) a side view of the auscultation-assisting tool with the hollow portion thereof expanded for use.
Figure 5B:
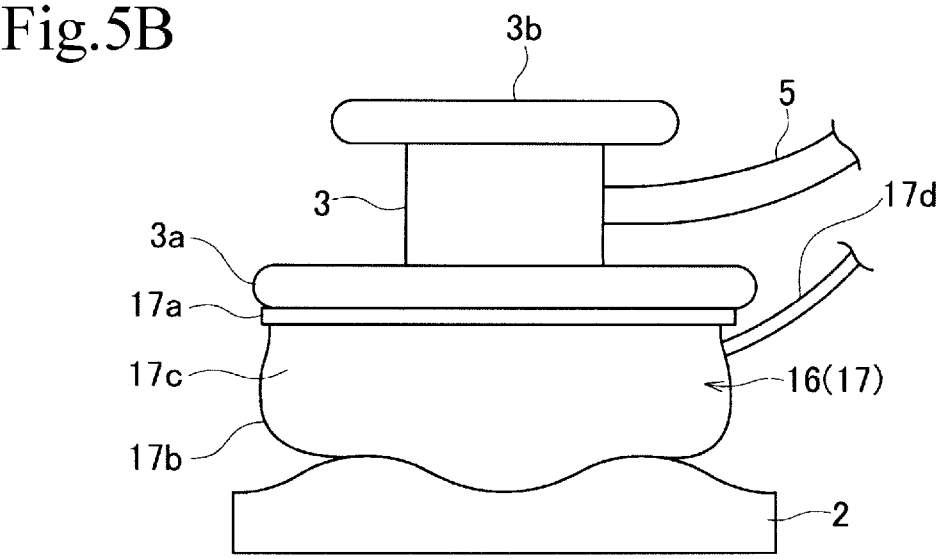

Specifically, as illustrated in FIG. 5(*a*), an auscultation-assisting tool 16 according to another embodiment may be employed, in which a second film portion 17b is expandable and contractible relative to a first film portion 17a serving as a base of a hollow sheet 17 and is provided with a feeding tube 17d through which a transmission medium, specifically gas such as air or liquid such as water, is fed into a hollow portion 17c of the second film portion 17b from an external device such as a pump or a syringe. In such a configuration where the feeding tube 17d for feeding the transmission medium is connected to the second film portion 17b, the capacity of the hollow portion 17c is changeable according to need.

In the present embodiment, as illustrated in FIG. 5(*b*), when the transmission medium starts to be fed into the hollow portion 17c for auscultation and the hollow portion 17c is filled with the transmission medium, the hollow sheet 17 is expanded to conform to the shape of the examination site 2. Therefore, the entirety of the diaphragm provided at the contact portion 3a of the chest piece 3 is allowed to vibrate. Furthermore, the entry of noises through gaps between the chest piece 3 and the examination site 2 is prevented. Therefore, the audibility of auscultatory sounds is improved.

In the present embodiment, the capacity of the hollow portion 17c is changeable by feeding the transmission medium into the hollow portion 17c when necessary. Therefore, if the size of the auscultation-assisting tool 16 is reduced at times of transportation, the transportation cost can be reduced. The transmission medium to be fed into the hollow portion 17c is gas such as air or liquid such as water. If, for example, the lightness of the auscultation-assisting tool 16 is given a priority, gas is employed. If the ease of sound transmission is given a priority, liquid is employed.

The present embodiment employs a configuration in which the auscultation-assisting tool 16 is attachable to and detachable from the diaphragm included in the chest piece 3. Another configuration may be employed in which an auscultation-assisting tool including a hollow portion whose capacity is changeable is directly attached to the contact portion 3a of the chest piece 3 of the stethoscope 1. Moreover, the auscultatory sound filter 8 described above may be interposed between the diaphragm provided at the contact portion 3a of the chest piece 3 of the stethoscope 1 and the auscultation-assisting tool 16 to cut off noises of low and middle ranges, so that highly accurate auscultation of heart sounds is achieved.

While the use of the auscultation-assisting tool 6 or 16 according to any of the above embodiments improves the audibility of auscultatory sounds, there are some cases where auscultatory sounds are muffled. In such cases, an auscultatory-sound-amplifying unit 9 that amplifies auscultatory sounds may be interposed between the diaphragm 30 of the stethoscope 1 and the hollow sheet 7 or 17.

Figure 6:
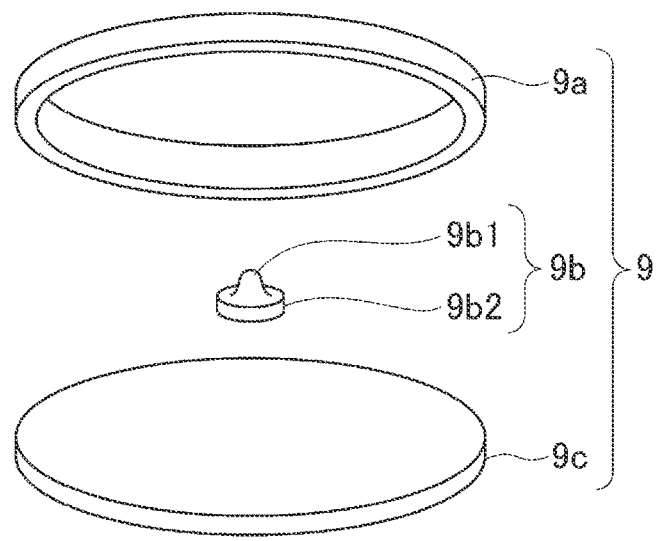
FIG. 6 is an exploded perspective view of an auscultation-assisting tool according to yet another embodiment of the present invention.

As illustrated in FIG. 6, the auscultatory-sound-amplifying unit 9 includes an annular member 9a, a convex member 9b, and a plate member 9c. The annular member 9a is a ring-shaped member that comes into contact with the outer periphery of the diaphragm 30 and serves as a spacer for providing a space as high as the convex member 9b, which comes into contact with the diaphragm 30. The convex member 9b includes a projection 9b1 projecting from a base portion 9b2. The projection 9b1 comes into contact with a central part of the diaphragm 30 and is provided on the inner side of the annular member 9a. The plate member 9c is a thin plate-like member to be positioned between the base portion 9b2 of the projection member 9b and the hollow sheet 7 or 17. The plate member 9c has a function of transmitting vibrations from the hollow sheet 7 while supporting the annular member 9a and the convex member 9b.

Double-sided tape or adhesive, for example, is interposed for fixation between the annular member 9a and the plate member 9c and between the base portion 9b2 of the convex member 9b and the plate member 9c. The annular member 9a, the convex member 9b, and the plate member 9c forming the auscultatory-sound-amplifying unit 9 are made of, for example, resin such as epoxy resin, nylon resin, polymer resin, silicone, or urethane; or metal such as stainless steel, as with the diaphragm 30.

Figure 7:
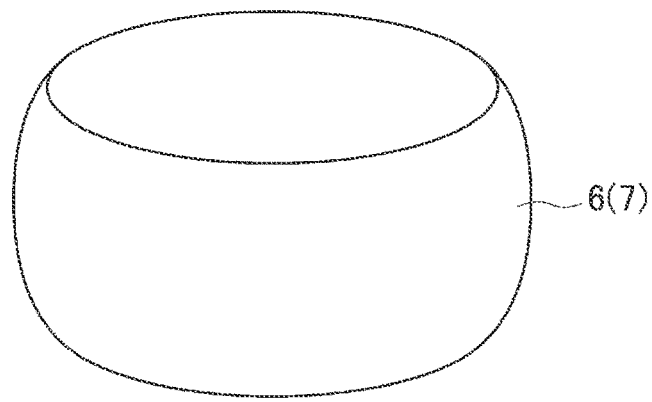
FIG. 7 is a sectional view of an auscultatory-sound-amplifying unit and illustrates the auscultation-assisting tool according to the yet another embodiment of the present invention that is used with the auscultatory-sound-amplifying unit.

When the auscultatory-sound-amplifying unit 9 is interposed between the diaphragm 30 and the hollow sheet 7, as illustrated in FIG. 7, the annular member 9a that is in contact with the outer periphery of the diaphragm 30 and the convex member 9b that is in contact with the central part of the diaphragm 30 are supported by the plate member 9c that is in contact with the hollow sheet 7. Therefore, the sound waves from the examination site 2 are transmitted through the hollow sheet 7 to the plate member 9c to vibrate the plate member 9c.

Thus, the plate member 9c is shaken to cause the projection 9b1 of the convex member 9b to intermittently come into contact with the surface of the diaphragm 30, whereby the diaphragm 30 generates sound waves. In such a configuration, the displacement of the vibrating part of the hollow sheet 7 is amplified by the plate member 9c and then causes the diaphragm 30 to vibrate with an increased amplitude. Thus, the auscultatory sounds are amplified.

That is, if the auscultatory-sound-amplifying unit 9 is interposed between the diaphragm 30 and the hollow sheet 7, not only the advantageous effects of the auscultation-assisting tool 6 described above are produced, but also the auscultatory sounds are amplified. Since the hollow sheet 7 is deformable in conformity with the irregular surface of the examination site 2 whose size and shape vary, the entry of noises through gaps between the chest piece 3 and the examination site 2 is suppressed. Thus, the audibility of auscultatory sounds is improved. Furthermore, the auscultatory-sound-amplifying unit 9 amplifies the auscultatory sounds. Therefore, the auscultatory sounds are prevented from being muffled. Consequently, highly accurate auscultation of sounds such as heart sounds and breath sounds is achieved.

While the present invention has been described above by providing some preferred embodiments, the present invention is not limited to the above embodiments. Needless to say, various changes can be made to the above embodiments within the scope of the present invention.

INDUSTRIAL APPLICABILITY

The embodiments of the present invention are applicable not only to medical stethoscopes intended for auscultation of sounds such as heart sounds and breath sounds generated from human bodies but also to industrial stethoscopes intended for auscultation of unusual sounds or the like generated from machines, and the like.

REFERENCE SIGNS LIST 1 stethoscope
2 examination site
3 chest piece
3a contact portion
3b contact portion
30 diaphragm
4 ear tip
5 tube
6, 16 auscultation-assisting tool
7, 17 hollow sheet
7a, 17a first film portion
7b, 17b second film portion
7c, 17c hollow portion
8 auscultatory sound filter
8a face
9 auscultatory-sound-amplifying unit
9a annular member
9b convex member
9c plate member
17d feeding tube

The invention claimed is:

1. An auscultation-assisting tool to be attached for use to a stethoscope, the stethoscope including a chest piece having a contact portion to be brought into contact with an examination site, the chest piece receiving sounds from the examination site, the auscultation-assisting tool comprising:
  a hollow sheet, made of resin film, detachably attached to a diaphragm included in the chest piece,
  wherein the hollow sheet includes
    a first film portion having an adhesive layer so as to detachably attach the hollow sheet to the chest piece;
    a second film portion having a hollow projection which is entirely exposed to an outside, brought into contact with the examination site, and deformable in conformity with an irregular surface of the examination site;
    and
    a hollow portion defined by the first film portion and the hollow projection of the second film portion and provided hermetically between the first film portion and the second film portion, and
  wherein a transmission medium that transmits sound is sealed in the hollow portion.

2. The auscultation-assisting tool according to claim 1, wherein the transmission medium is air or carbon dioxide.

3. The auscultation-assisting tool according to claim 1, wherein the transmission medium is liquid or gel.

4. An auscultation-assisting tool to be attached for use to a stethoscope, the stethoscope including a chest piece having a contact portion to be brought into contact with an examination site, the chest piece receiving sounds from the examination site, the auscultation-assisting tool comprising:
  a hollow sheet detachably attached to a diaphragm included in the chest piece,
  wherein the hollow sheet includes
    a first film portion detachably attached to the diaphragm;
    a second film portion to be brought into contact with the examination site and being deformable in conformity with an irregular surface of the examination site; and
    a hollow portion provided hermetically between the first film portion and the second film portion,
  wherein a transmission medium that transmits sound is sealed in the hollow portion, and
  wherein sterilized cotton, in addition to the transmission medium, is sealed in the hollow portion.

5. The auscultation-assisting tool according to claim 1, wherein an auscultatory sound filter made of an elastic member is interposed between the diaphragm and the hollow sheet.

6. The auscultation-assisting tool according to claim 5, wherein the auscultatory sound filter further includes an adhesive layer that is adherable to the hollow sheet.

7. An auscultation-assisting tool to be attached for use to a stethoscope, the stethoscope including a chest piece having a contact portion to be brought into contact with an examination site, the chest piece receiving sounds from the examination site, the auscultation-assisting tool comprising:
  a hollow sheet detachably attached to a diaphragm included in the chest piece,
  wherein the hollow sheet includes
    a first film portion detachably attached to the diaphragm;
    a second film portion to be brought into contact with the examination site and being deformable in conformity with an irregular surface of the examination site; and
    a hollow portion provided hermetically between the first film portion and the second film portion,
  wherein a transmission medium that transmits sound is sealed in the hollow portion, and wherein the second film portion is further provided with a feeding tube through which the transmission medium is fed into the hollow portion such that a capacity of the hollow portion is changeable.

8. The auscultation-assisting tool according to claim 1, wherein an auscultatory-sound-amplifying unit that amplifies auscultatory sounds is interposed between the diaphragm and the hollow sheet.

9. The auscultation-assisting tool according to claim 8, wherein the auscultatory-sound-amplifying unit includes
an annular member to be in contact with an outer periphery of the diaphragm;
a convex member having a projection that projects from a base portion and is to be in contact with a central part of the diaphragm; and
a plate member to be positioned between the base portion of the convex member and the hollow sheet.

10. A stethoscope comprising:
a chest piece having a contact portion to be brought into contact with an examination site, the chest piece receiving sounds from the examination site;
ear tips to be fitted to ears of an examiner; and
a tube that connects the chest piece to the ear tips and through which the sounds from the examination site are transmitted to the examiner,
wherein the chest piece includes a diaphragm to which the auscultation-assisting tool according to claim 1 is attached.

11. The auscultation-assisting tool according to claim 1, wherein the first film portion is attached to the diaphragm via the adhesive layer, and the second film portion is applied to and closely fits the irregular surface of the examination site.

12. The auscultation-assisting tool according to claim 1, wherein, in a non-used state, a circular shape and diameter of the hollow portion in a plan-view is same as a shape and diameter of the diaphragm in a plan-view.

13. The auscultation-assisting tool according to claim 1, wherein the first film portion and the second film portion have a thickness of 10 µm to 0.5 mm.

* * * * *